US008139856B2

(12) United States Patent
Hattori et al.

(10) Patent No.: US 8,139,856 B2
(45) Date of Patent: Mar. 20, 2012

(54) IMAGE PROCESSING APPARATUS, IMAGING APPARATUS, AND COMPUTER READABLE MEDIUM IRREGULARIZING PIXEL SIGNALS CONTINUOUS IN LEVEL NEAR A SATURATION LEVEL

(75) Inventors: Yuko Hattori, Yokohama (JP); Tsutomu Nishizawa, Kawasaki (JP)

(73) Assignee: Nikon Corporation, Tokyo (JP)

( * ) Notice: Subject to any disclaimer, the term of this patent is extended or adjusted under 35 U.S.C. 154(b) by 1113 days.

(21) Appl. No.: 11/979,198

(22) Filed: Oct. 31, 2007

(65) Prior Publication Data

US 2008/0111893 A1    May 15, 2008

(30) Foreign Application Priority Data

Nov. 6, 2006   (JP) .................................. 2006-300684

(51) Int. Cl.
*G06K 9/00* (2006.01)
*G06K 9/40* (2006.01)
*G09G 1/14* (2006.01)
*G09G 3/28* (2006.01)
*G09G 3/30* (2006.01)
*G09G 5/00* (2006.01)
*G09G 5/02* (2006.01)
*H04N 9/64* (2006.01)
*H04N 5/202* (2006.01)
*H04N 11/20* (2006.01)
*G01C 19/72* (2006.01)
*G03F 3/08* (2006.01)

(52) U.S. Cl. .......... 382/167; 382/162; 382/274; 345/20; 345/62; 345/77; 345/581; 345/596; 345/589; 345/690; 348/251; 348/254; 348/453; 358/461; 358/518

(58) Field of Classification Search ........................ None
See application file for complete search history.

(56) References Cited

U.S. PATENT DOCUMENTS

| 4,663,663 | A  | * | 5/1987 | Lee ................................. 358/506 |
| 6,028,957 | A  | * | 2/2000 | Katori et al. .................... 382/162 |
| 7,515,318 | B2 | * | 4/2009 | Nishikori et al. ............... 358/520 |
| 7,840,063 | B2 | * | 11/2010 | Koyanagi et al. ............... 382/162 |
| 2005/0001913 | A1 |  | 1/2005 | Hoshuyama |
| 2005/0104974 | A1 | * | 5/2005 | Watanabe et al. ........... 348/222.1 |
| 2005/0162704 | A1 | * | 7/2005 | He et al. ........................ 358/3.06 |
| 2007/0081738 | A1 | * | 4/2007 | Mantell .......................... 382/274 |
| 2008/0012955 | A1 | * | 1/2008 | Johnson et al. ............. 348/222.1 |

FOREIGN PATENT DOCUMENTS

| JP | A-07-250253 | 9/1995 |
| JP | A-2003-009165 | 1/2003 |
| JP | A-2005-026962 | 1/2005 |
| JP | A-2005-072835 | 3/2005 |

OTHER PUBLICATIONS

Office Action issued in Japanese Application No. 2006-300684 dated Jan. 18, 2011 (with translation).

\* cited by examiner

*Primary Examiner* — Randolph I Chu (74) *Attorney, Agent, or Firm* — Oliff & Berridge, PLC (57) ABSTRACT

An image processing apparatus, a computer readable medium and the like in which a dither effect in a neighborhood of a highlight area can be obtained easily and certainly. For this purpose, an image processing apparatus includes an inputting unit which inputs a pixel signal group representing a field image, an averaging unit (21-2 and 21-3) which performs a processing having an averaging effect among the pixel signal group input by the inputting unit, and an irregularizing unit (21-4) which irregularizes mutually continuous signal-values at least near a saturated level among the pixel signal group after having been processed by the averaging unit, into discontinuous signal-values.

17 Claims, 7 Drawing Sheets

| IRREGULARIZING TABLE | SATURATION RATE | SENSITIVITY | CHROMATIC CORRECTION | EDGE REINFORCEMENT |
|---|---|---|---|---|
| IRREGULARIZING TABLE $T_{NH}$ (HIGH DEGREE) | HIGH ↔ LOW | LOW ↔ HIGH | LOW ↔ HIGH | LOW ↔ HIGH |
| IRREGULARIZING TABLE $T_{NM}$ (MEDIUM DEGREE) | | | | |
| IRREGULARIZING TABLE $T_{NL}$ (LOW DEGREE) | | | | |
| NO IRREGULARIZING TABLE (ZERO DEGREE) | | | | |

IMAGE PROCESSING APPARATUS, IMAGING APPARATUS, AND COMPUTER READABLE MEDIUM IRREGULARIZING PIXEL SIGNALS CONTINUOUS IN LEVEL NEAR A SATURATION LEVEL

CROSS-REFERENCE TO RELATED APPLICATION

This application is based upon and claims the benefit of priority from Japanese Patent Application No. 2006-300684, filed on Nov. 6, 2006, the entire contents of which are incorporated herein by reference.

BACKGROUND

1. Field

The present invention relates to an image processing apparatus mounted in an electronic still camera and the like, an imaging apparatus such as an electronic still camera, and a computer readable medium.

2. Description of the Related Art

When there is an outstandingly bright object in a field to be photographed with a camera, there arises a highlight area (saturated white area) at a part of a photographed image. This highlight area has a completely flat tone differently from other area and a distinguished outline thereof provides a viewer with an unnatural impression.

The patent reference 1 discloses a signal processing technique to make the outline unnoticeable. This technique intentionally adds random noise to a signal at an almost saturated level. A dither effect (roughness sensation) is thereby provided to a neighborhood of the highlight area to make the outline thereof appear vague.

Patent reference 1: Japanese Unexamined Patent Application Publication No. 2005-72835

However, if this signal processing technique is applied to an electronic still camera without any modification, it is found that the dither effect can not always be obtained depending on an application method and a use condition thereof.

SUMMARY

Accordingly, an object of the present invention is to provide an image processing apparatus and a computer readable medium in which a dither effect around a highlight area can be obtained easily and certainly, and to provide an imaging apparatus which is excellent in highlight expression.

An image processing apparatus according to the present invention includes an inputting unit which inputs a pixel signal group representing a field image, an averaging unit which provides processing having an averaging effect in the pixel signal group input by the inputting unit, and an irregularizing unit which irregularizes mutually continuous signal-values at least near a saturated level among the pixel signal group after having been processed by the averaging unit, into discontinuous signal-values.

Here, the image processing apparatus according to the present invention may further includes an information-compressioning unit which performs processing having an information-compressional effect in a brightness direction on the pixel signal group after having been processed by the irregulariziing unit.

Also, processing by the irregularizing unit is preferably tone conversional processing using a look-up table.

Also, contents of the look-up table are preferably set so that processing of the irregularization and other processing of tone correction can be performed on the pixel signal group at the same time.

Also, contents of the look-up table are preferably set so that amplitude of the irregularization can depend on a magnitude of the signal-value before the irregularization.

Also, the irregularizing unit preferably has multiple sorts of look-up tables with different amplitudes of the irregularization and uses these look-up tables by switching according to the number of pixel signals at a saturated level among the pixel signal group.

Also, the irregularizing unit preferably has multiple sorts of look-up tables with different amplitudes of the irregularization and uses these look-up tables by switching according to contents of one or more kinds of processing which are to be performed on the pixel signal group by units except for the irregularizing unit.

Also, an imaging apparatus according to the present invention includes an imaging sensor which captures a pixel signal group representing a field image and any of the image processing apparatus according to the present invention.

Also, a computer readable medium including image processing program according to the present invention, executable by an image processing apparatus, includes an inputting operation which inputs a pixel signal group representing a field image, an averaging operation which performs processing having an averaging effect among the pixel signal group input by the inputting operation, and an irregularizing operation which irregularizes mutually continuous signal-values at least near a saturated level among the pixel signal group after having been processed by the averaging unit, into discontinuous signal-values.

Note that the computer readable medium according to the present invention may further include an information-compressioning operation which performs processing having an information-compressional effect in a brightness direction on the pixel signal group after having been processed by the irregularizing operation.

Also, the processing by the irregularizing operation is preferably tone conversional processing using a look-up table.

Accordingly, the present invention realizes an image processing apparatus and a computer readable medium in which a dither effect around a highlight area can be obtained easily and certainly. Also, the present invention realizes an imaging apparatus which is excellent in highlight expression.

DETAILED DESCRIPTION OF THE EMBODIMENTS

First Embodiment

Hereinbelow, a first embodiment according to the present invention will be described.

The present embodiment is an embodiment for an electronic still camera system.

First, a configuration of a present system will be described.

Figure 1:
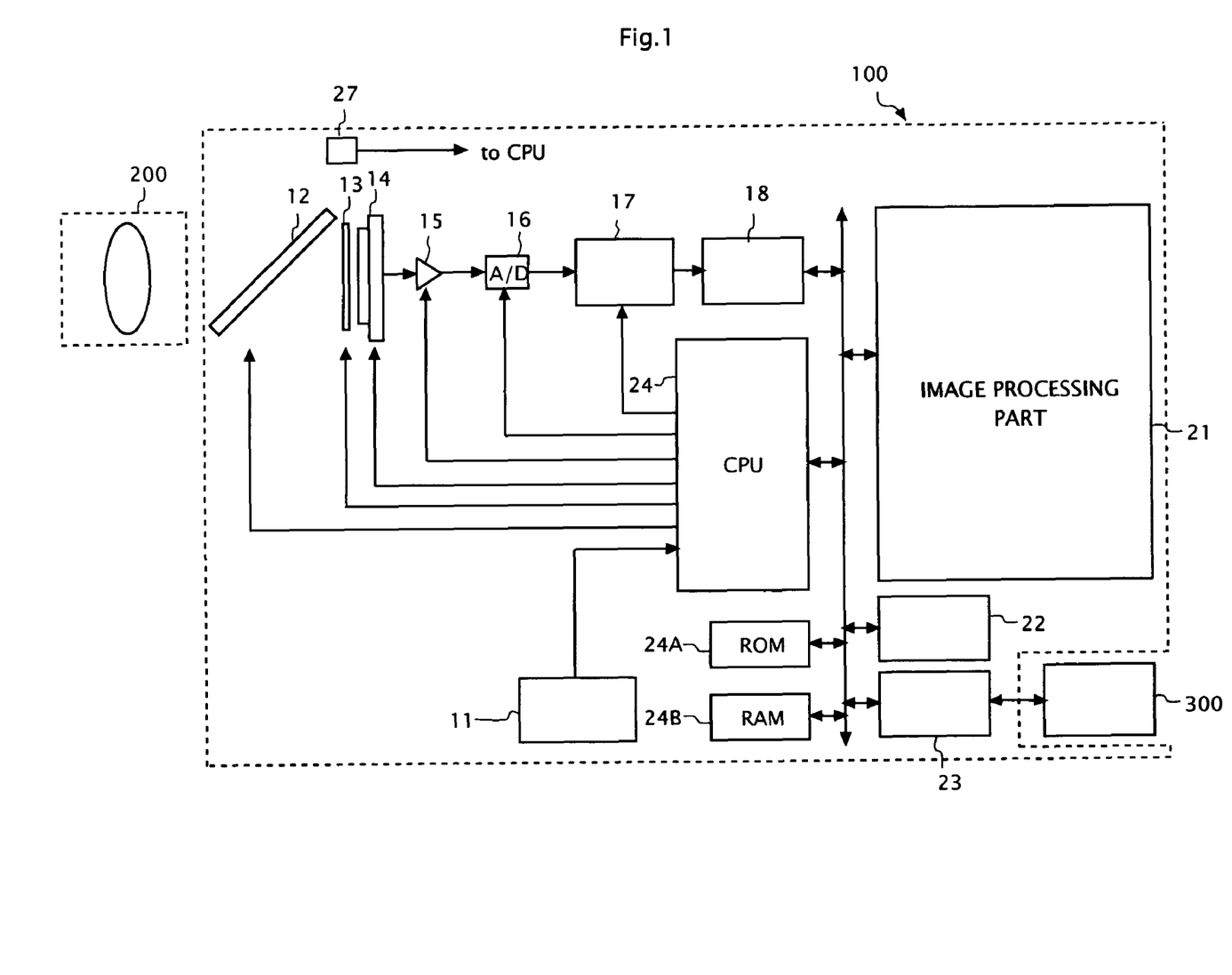
FIG. 1 is a functional block diagram of a present system.

FIG. 1 is a functional block diagram of the present system. As shown in FIG. 1, the present system includes an electronic still camera body 100 and a shooting lens 200 attached to the electronic still camera body 100.

The electronic still camera body 100 is attached with a portable storage medium 300 such as a card memory and includes an operating button 11, a quick-return mirror 12, a shutter 13, a color imaging sensor (CCD, CMOS, etc.) 14, an amplifier 15, an A/D converter 16, a signal processing circuit 17, a frame memory 18, an image processing part 21, a compressionnal/decompressional processing part 22, a storaging part 23, a CPU 24, a ROM 24A, a RAM 24B, a photometric sensor 27, etc. The ROM 24A preliminarily stores an operating program of the CPU 24 and various kinds of information, and the RAM 24B temporally stores information required by the CPU 24 during operation thereof.

The frame memory 18, the image processing part 21, the compressional/decompressional processing part 22, the storaging part 23, the CPU 24, the ROM 24A and the RAM 24B are coupled one another via a bus. When a user manipulates the operating button 11 to input various indications to the present system, the CPU 24 recognizes contents of the indications, and sets and controls each part following them to operate the present system.

The user can switch a mode of the present system among various modes such as a shooting mode and a setting mode by manipulating the operating button 11. Also the user can input a release indication (shooting indication) into the present system by manipulating the operating button 11, when the present system is in the shooting mode. Also, the user can specify which tone correction degree, "high", "medium", or "low", is to be set to the present system by manipulating the operating button 11, when the present system is in the setting mode.

Next, a basic operation of the present system in the shooting mode will be described.

When a user inputs a release indication, the CPU 24 starts to drive the quick-return mirror 12, the shutter 13, the color imaging sensor 14, the amplifier 15, the A/D converter 16, and the signal processing circuit 17. A pixel signal read out from the color imaging sensor 14 at this time is stored into the frame memory 18 sequentially via the amplifier 15, the A/D converter 16 and the signal processing circuit 17. When one frame of the pixel signals is stored in the frame memory 18, one cycle of shooting is completed. Hereinafter, whole pixel signals of one frame are called an "image" and each pixel signal is called a "pixel".

After shooting, the CPU 24 instructs the image processing part 21 to perform various kinds of image processing on an image stored in the frame memory 18. Then, the CPU 24 instructs the compressional/decompressional processing part 22 to perform compressional processing on the image after the image processing. This compressional processing also includes information-compressional processing to reduce the number of tones of an image. For example, while the number of tones before the compressional processing is 12 bits, the number of tones after the compressional processing becomes 8 bits. Further, the CPU 24 instructs the storaging part 23 to write the image after the compressional processing into the storage medium 300. Thereby, storing of an image is completed.

Next, image processing by the image processing part 21 will be described in detail.

Figure 2:
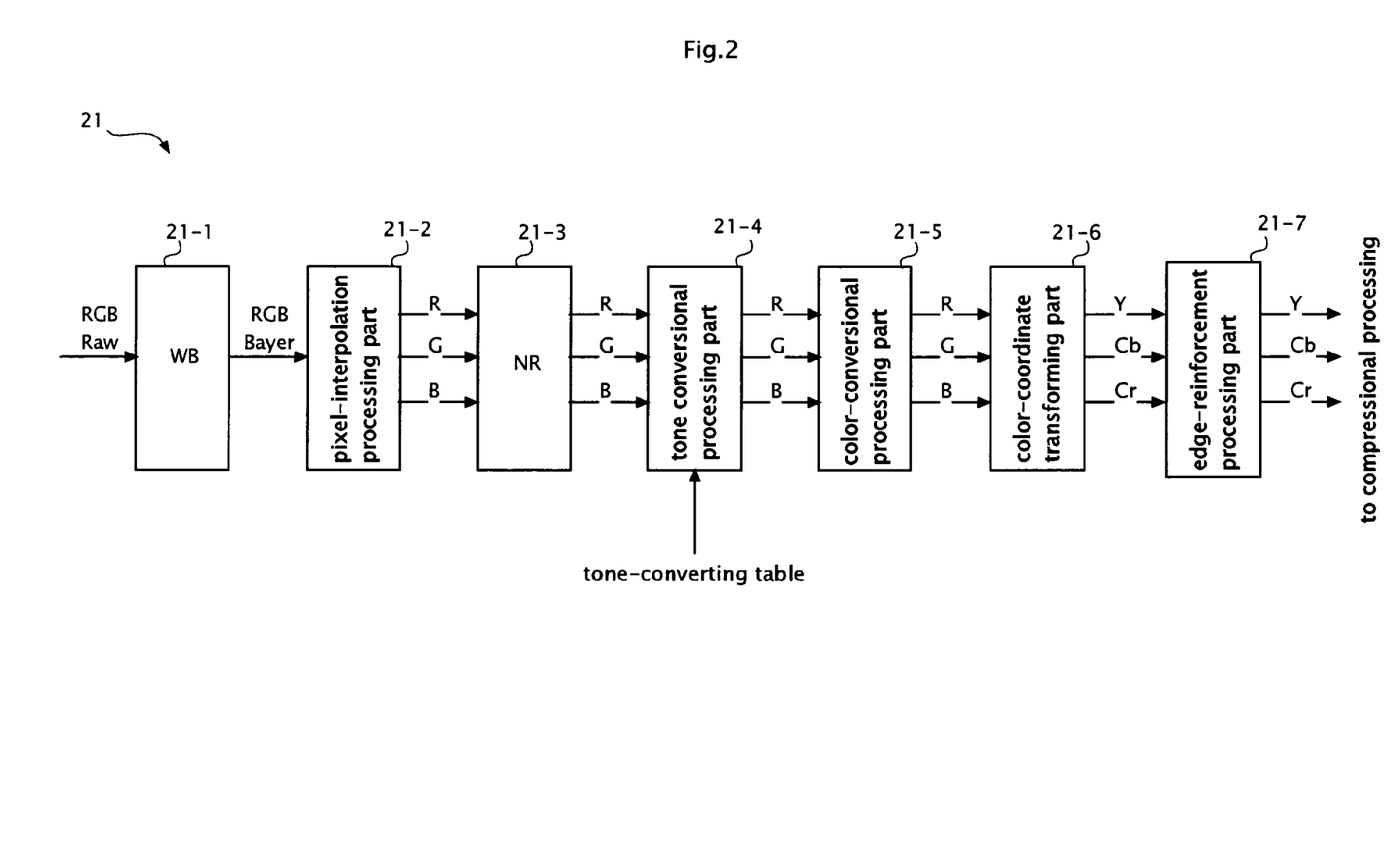
FIG. 2 is a functional block diagram of an image processing part 21.

FIG. 2 is a functional block diagram of the image processing part 21. In FIG. 2, arrangement of each block shows an order of execution of processing by each of the blocks, and the left side is an upstream side and the right side is a down stream side.

As shown in FIG. 2, the image processing part 21 includes a white-balance processing part 21-1 which adjusts an intensity balance among color components of an image (R, G, and B), a pixel-interpolation processing part 21-2 which interpolates lacking pixels of each color component using surrounding pixels in an image, a noise reducing part 21-3 which makes a luminance level of an outstanding pixel in an image close to a luminance level of a surrounding pixel, a tone conversional processing part 21-4 which converts a luminance level of each pixel in an image using a tone-converting table, a color-conversional processing part 21-5 which converts a color of each pixel in an image using a color-converting matrix, a color-coordinate transforming part 21-6 which performs coordinate transformation from a calorimetric system (R, G, and B) of an image to other colorimetric system (Y, Cb, and Cr), an edge-reinforcement processing part 21-7 which reinforces an edge of a picture in an image using an edge filter, etc.

Among these parts, the tone conversional processing part 21-4 uses a tone-converting table commonly for tone conversion of an R component, tone conversion of a G component and tone conversion of a B component in an image. This tone converting table is a look-up table which is generated and set by the CPU 24. This tone-converting table has two functions; one is a tone-correcting function which changes tone reproducibility of an image (including a gamma correction) and the other is an irregularizing function which provides a dither effect to a neighborhood of a highlight area in an image. Operation of the CPU 24 regarding generation and setting of the tone converting table will be described in detail hereinafter.

In the above described image processing part 21, an execution order is not limited to the order of the white-balance processing part 21-1, the pixel-interpolation processing part 21-2, the noise reducing part 21-3, the tone conversional processing part 21-4, the color conversional processing part 21-5, the color-coordinate transforming part 21-6, and the edge-reinforcement processing part 21-7.

Note that, since processing in the pixel-interpolation processing part 21-2 and processing in the noise reducing part 21-3 have an effect to average an image in a spatial direction (low-pass effect), and a noise-adding function in the tone-conversional processing part 21-4 and processing in the edge-reinforcement processing part 21-7 have an inverse effect (high-pass effect), a block with the high-pass effect (tone-conversional processing part 21-4 and the edge-reinforcement processing part 21-7) should be arranged in a subsequent stage of a block with the low-pass effect (pixel-interpolation processing part 21-2 and the noise reducing part 21-7) to obtain the maximum effects from the both blocks.

Next, information stored preliminarily in the ROM 24A will be described.

Figure 3:
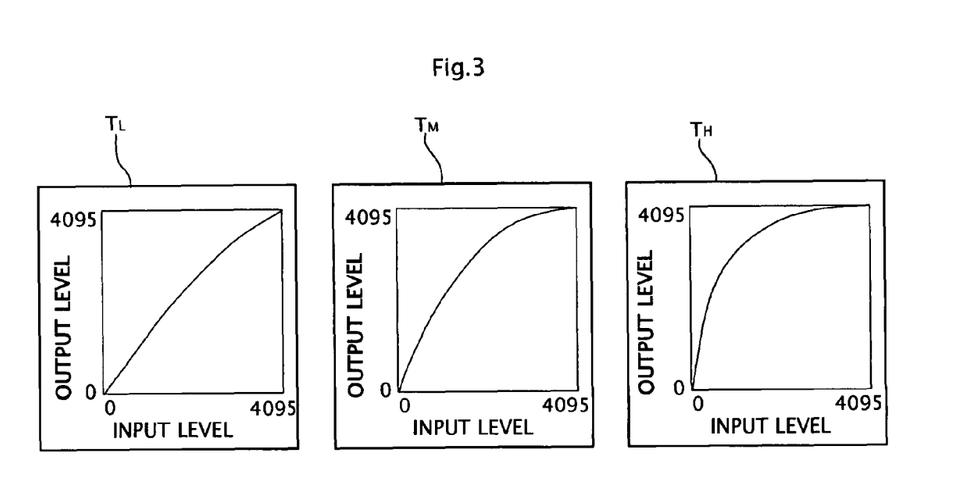
FIG. 3 is an explanatory diagram of correcting tables $T_L$, $T_M$, and $T_H$.
Figure 4:
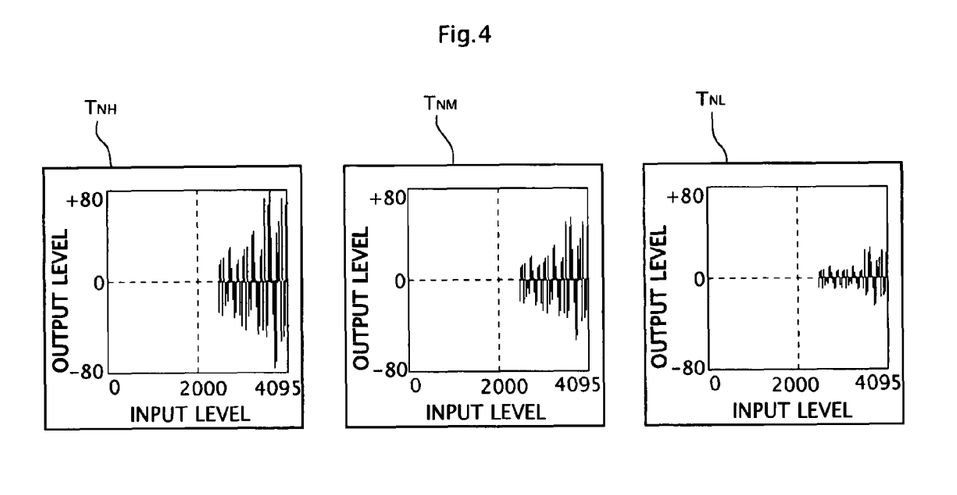
FIG. 4 is an explanatory diagram of irregularizing tables $T_{NL}$, $T_{NM}$, and $T_{NH}$.

The ROM 24A stores preliminarily multiple sorts of correcting tables $T_L$, $T_M$, and $T_H$ as shown in FIG. 3, and multiple sorts of irregularizing tables $T_{NL}$, $T_{NM}$, and $T_{NH}$ as shown in FIG. 4 as basic information for the CPU 24 to generate a tone-converting table. As shown in FIG. 3, differences among the correcting tables $T_L$, $T_M$, and $T_H$ lie in tone correction degrees like "low", "medium", and "high". As shown in FIG. 4, differences among the irregularizing tables $T_{NL}$, $T_{NM}$, and $T_{NH}$ lie in irregularization degrees like "high", "medium", and "low". Here, in FIG. 4, an increment of an input level is shown to be larger than in an actual case for easy understanding.

Next, characteristics of the irregularizing table $T_{NH}$ will be described in detail.

Figure 5:
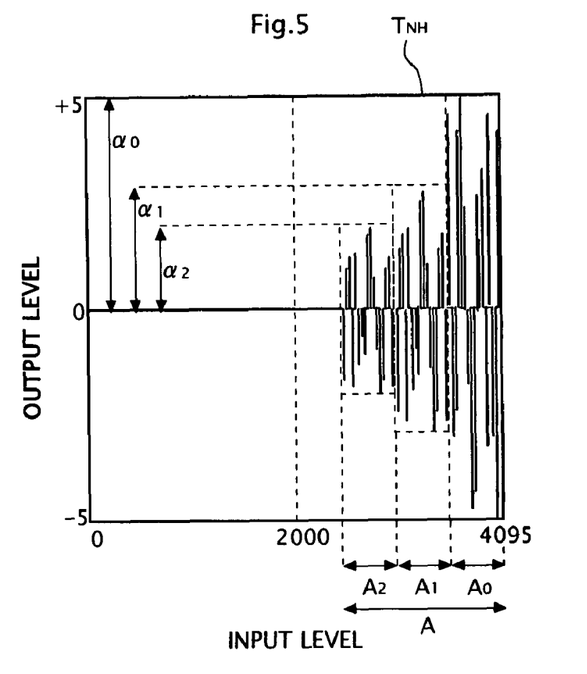
FIG. 5 is an explanatory diagram of characteristics of the irregularizing table $T_{NH}$.

FIG. 5 is a diagram illustrating characteristics of the irregularizing table $T_{NH}$. Also in FIG. 5, an increment of an input level is shown to be larger than in an actual case. As shown in FIG. 5, the characteristics of the irregularizing table $T_{NH}$ are set so as to provide a variation in a luminance level for a pixel with a luminance level belonging to a range A near a saturated level among input pixels. Converting a continuous luminance level to a discontinuous luminance level in this manner is called "irregularization" in the present specification.

A level change amount in this irregularization varies according to an input level, and is preliminarily determined to be a random value ranging from $-\alpha$ to $+\alpha$. This "$\alpha$" is an irregularizing amplitude. The irregularizing amplitude $\alpha$ is set to be larger for a higher input level. For example, as shown in FIG. 5, the amplitude $\alpha$ is set to be a small value $\alpha_2$ in a lower level side range $A_2$ within a range A, the amplitude $\alpha$ is set to be a medium value $\alpha_1$ in a medium range $A_1$ within the range A, and the amplitude $\alpha$ is set to be a large value $\alpha_0$ in a higher level side range $A_0$ within the range A.

The above described characteristics of the irregularizing table $T_{NH}$ apply similarly to the other two irregularizing tables $T_{NL}$ and $T_{NM}$. Note that the amplitude $\alpha$ is set to be a different value among the three irregularizing tables $T_{NL}$, $T_{NM}$, and $T_{NH}$ as shown in FIG. 4. An amplitude $\alpha$ in the irregularizing table $T_{NH}$ is the largest, an amplitude $\alpha$ in the irregularizing table $T_{NM}$ is the second largest, and an amplitude $\alpha$ in the irregularizing table $T_{NL}$ is the smallest.

Figure 6:
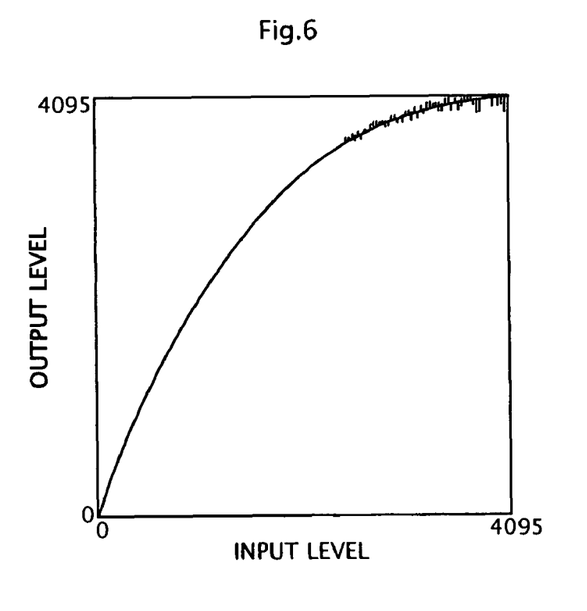
FIG. 6 is a diagram showing an example of a tone-converting table.

According to the above described basic information, the CPU 24 can generate a tone-converting table such as shown in FIG. 6, for example, by selecting any of the correcting tables $T_L$, $T_M$, and $T_H$ shown in FIG. 3 and any of the irregularizing tables $T_{NL}$, $T_{NM}$, and $T_{NH}$ shown in FIG. 4 and by additively synthesizing selected two tables. The generated tone-converting table is provided with both of the tone-correcting function and the irregularization function.

Here, the tone-correction degree varies depending on which correcting table is used among the three correcting tables $T_L$, $T_M$, and $T_H$ shown in FIG. 3. Also, the irregularization degree varies depending on which irregularizing table is used among the three irregularizing tables shown $T_{NL}$, $T_{NM}$, and $T_{NH}$ shown in FIG. 4.

Next, an operational flow of the CPU 24 in the shooting mode will be described in detail.

Figure 7:
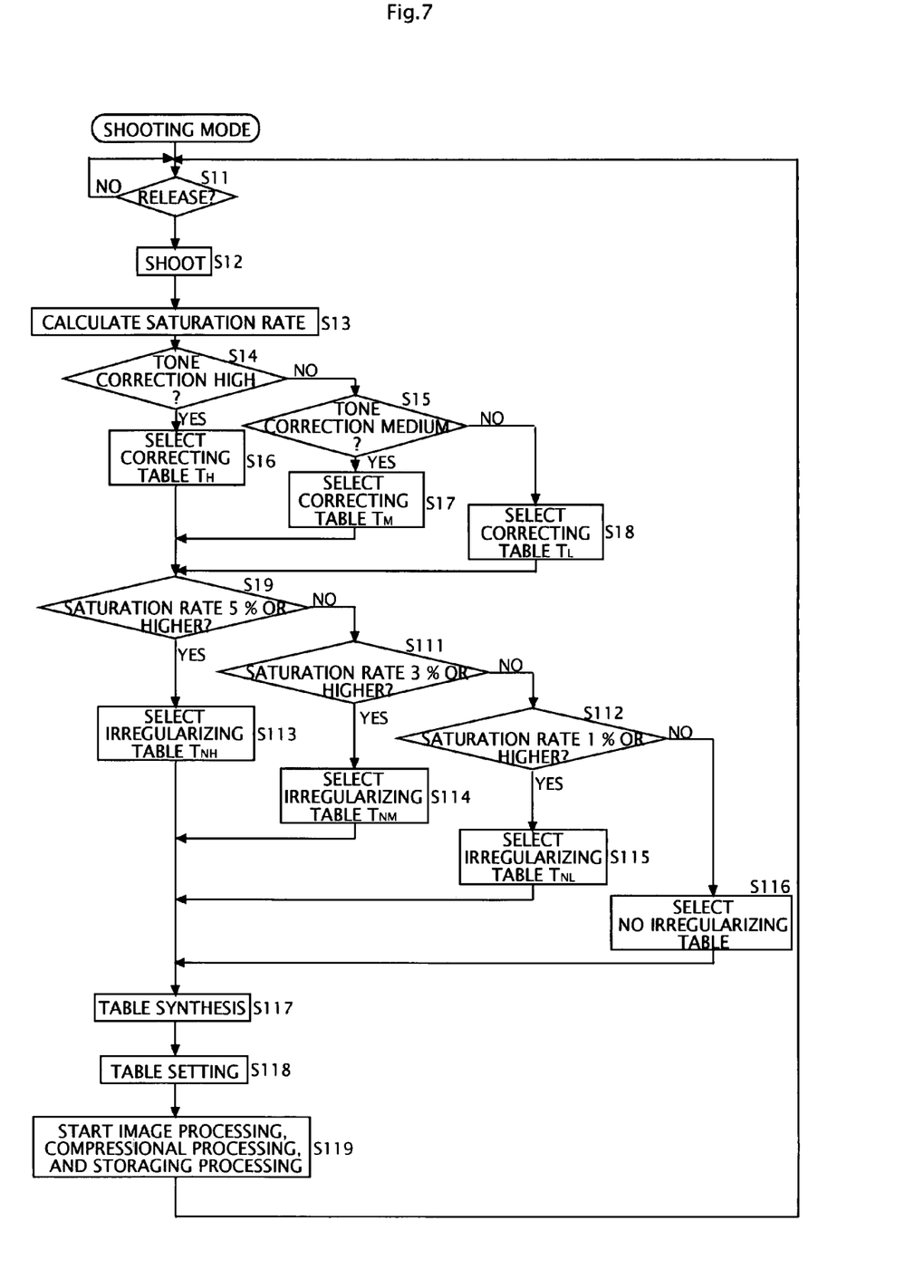
FIG. 7 is an operational flow chart of a CPU 24 in a shooting mode according to a first embodiment.

FIG. 7 is an operational flow chart of the CPU 24 in the shooting mode. As shown in FIG. 7, when a user inputs a release indication (Step S11 YES), the CPU 24 drives each part to carry out a shooting (Step S12). The diving method of each part is as described hereinabove.

Then, the CPU 24 calculates a saturation ratio from an image captured in this shooting (Step 13). The calculation of the saturation ratio is performed, for example, as follows. The CPU 24 divides an image into multiple small areas and obtains a luminance level of each small area. The luminance level of a small area is an average luminance level of pixels within the small area. Further, the CPU 24 compares a luminance level of each small area with a threshold value and assumes a small area, where the luminance level is over the threshold value, as a highlight area. Further, the CPU 24 divides the number of the small areas assumed to be highlight areas by the number of total small areas to calculate an occupation ratio of the highlight areas on an image. This ratio is the image saturation ratio and takes any value between 0% and 100%. A lower saturation ratio has less need of irregularization and a higher saturation ratio has greater need of irregularization.

On the other hand, the CPU 24 determines whether a tone-correction degree indicated by the user is "high" or not (Step 14), and selects the correcting table $T_H$ with a high correction degree among the correcting tables $T_L$, $T_M$, and $T_H$ shown in FIG. 3, in the case of "high" (Step S14 YES).

Also, the CPU 24 determines whether the tone-correction degree indicated by the user is "medium" or not (Step S15), in the case the degree indicated by the user is not "high" (Step S14 NO), and selects the correcting table $T_M$ with a medium correction degree among the correcting tables $T_L$, $T_M$, and $T_H$ shown in FIG. 3 in the case of "medium" (Step 15 YES).

Also, the CPU 24 selects the correcting table $T_L$ with a low correction degree among the correcting tables $T_L$, $T_M$, and $T_H$ shown in FIG. 3 in the case the degree indicated by the user is not "medium" (Step S15 NO).

Further, the CPU 24 determines whether the saturation ratio calculated in Step S13 is 5% or higher (Step S19), and, in the case of 5% or higher (Step S19 YES), the CPU 24 selects the irregularizing table $T_{NH}$ with a high irregularization degree among the irregularizing tables $T_{NL}$, $T_{NM}$, and $T_{NH}$ shown in FIG. 4 (Step S113), because need of irregularization is extremely high.

Also, the CPU 24 determines whether the saturation ratio is 3% or higher (Step S111) in the case of lower than 5% saturation ratio (Step S19 NO), and, in the case of 3% or higher Step S111 YES), the CPU 24 selects the irregularizing table $T_{NM}$ with a medium irregularization degree among the irregularizing tables $T_{NL}$, $T_{NM}$, and $T_{NH}$ shown in FIG. 4 (Step S114), because need of irregularization is comparatively high.

Also, the CPU 24 determines whether the saturation ratio is 1% or higher (Step S112) in the case of lower than 3% saturation ratio (Step S111 NO), and, in the case of 1% or higher (Step S 112 YES), the CPU 24 selects the irregularizing table with $T_{NL}$ a low irregularization degree among the irregularizing tables $T_{NL}$, $T_{NM}$, and $T_{NH}$ shown in FIG. 4 (Step S115), because need of irregularization is low.

Also, the CPU 24 does not select an irregularizing table (Step S116) in the case the saturation ratio is lower than 1% (Step S112 NO), because irregularization is not needed.

Then, the CPU 24 synthesizes a selected correcting table and a selected irregularizing table to generate a tone-converting table. Here, when an output level after the synthesis exceeds a saturated level, the output level is clipped at the saturated level. Also, when an irregularizing table is not selected, a selected correcting table itself becomes a tone-converting table without any synthesis (Step S117).

Further, the CPU 24 sets the generated tone-converting table to the tone-conversional processing part 21-4 (Step S118), and starts to drive the image processing part 21, the compressional/decompressional processing part 22, and the storaging part 23 (Step S119). The driving method of each part is as described hereinabove.

Next, advantages of the present system will be described.

The CPU 24 in the present system reflects contents of an irregularizing table (refer to FIG. 4) into a tone-converting table used by the tone conversional processing part 21-4 (refer to FIG. 2). Therefore, a dither effect can be applied to a neighborhood of a highlight area of an image without complicating a circuit within the electronic still camera 100.

Also, the dither effect applied to an image can be preserved securely because the tone conversional processing part 21-4 (refer to FIG. 2) is arranged in a subsequent stage of the pixel-interpolation processing part 21-2 and the noise-reducing part 21-3, which have a low-pass effect.

Here, since the present system uses a tone-converting table for applying a dither effect, pixels with the same luminance level are converted to pixels with the same luminance level. Also, generally in a field image, pixels spatially neighboring each other have a tendency to have neighboring levels also in luminance. Therefore, there is a possibility in the present system that noise with the same value might be generated densely on an image after tone conversion.

In the present system, however, since the tone conversional processing part 21-4 is arranged in a previous stage of the compressional/decompressional processing part 22, that is, in the previous stage of reducing processing of the number of tones, it is probable that even pixels spatially neighboring each other would have different luminance levels in an image just before the tone conversion. Therefore, in the present system, the problem that the noise with the same value might be generated densely on an image does not occur frequently.

Also, in the present system, image processing can be carried out efficiently, since the tone conversional processing part 21-4 is provided with both of the irregularizing function and the tone correcting function.

Also, in the present system, contents of an irregularizing table are set so that an irregularization degree depends on a luminance level of a pixel. Specifically, an irregularizing amplitude α is set to be larger for a higher luminance level (refer to FIG. 4), and a boundary between an area with a dither effect and an area without a dither effect on an image can be made vague to provide a natural impression to a viewer.

Also, in the present system, an irregularization degree can be always set to a necessary and also a sufficient level, since which irregularizing table is used among $T_{NL}$, $T_{NM}$, and $T_{NH}$ depends on a saturation rate of an image (Steps S19, S111, S112, S113, S114, and S 115 in FIG. 7).

Also, in the present system, freedom to change tone-conversional characteristics can be made greater while suppressing a capacity of the ROM 24A, since the correcting tables $T_L$, $T_M$, and $T_H$ and the irregularizing tables $T_{NL}$, $T_{NM}$, and $T_{NH}$ are prepared separately and combined together to generate various sorts of tone-converting tables.

Note that, although the number of steps for changing the tone correction degree is three and the number of steps for changing the irregularization degree is four in the present system, the number of steps for changing either of the degrees can be changed. For example, if the tone correction degree is set to be "high", "medium", "low", or "zero" in the present system, the freedom to change the tone-conversional characteristics is increased to 16 degrees.

Also, while an object of the irregularization (here, an object of the tone conversional processing) is a newest image captured by shooting in the present system, the object may be an old image stored in the storage medium 300.

Also, the CPU 24 in the present system calculates the image saturation rate directly from an image, but also may estimate the rate from a BV value indicated by an output signal of the photometric sensor 27 (refer to FIG. 1). In the estimation, shooting conditions (exposure-compensating value and the like) set in the present system are preferably taken into consideration.

Second Embodiment

Hereinbelow, a second embodiment according to the present invention will be described. The present embodiment is also an embodiment for an electronic camera system. Here, only differences from the first embodiment will be described.

A user of a present system can specify a shooting sensitivity (ISO sensitivity) such as "1,600", "800", "400", "200", or "100" to the present system in a setting mode. A CPU 24 in the present system recognizes an ISO sensitivity specified by the user, and set a gain of an amplifier 15 accordingly (a higher gain is set for a larger specified value).

Also, the CPU 24 in the present system carries out generation and setting of a tone-converting table according to specifications for the ISO sensitivity and the tone correction degree in the setting mode. That is, in the present system, the generation and setting of the tone-converting table is carried out in a setting mode, not in a shooting mode.

Figure 8:
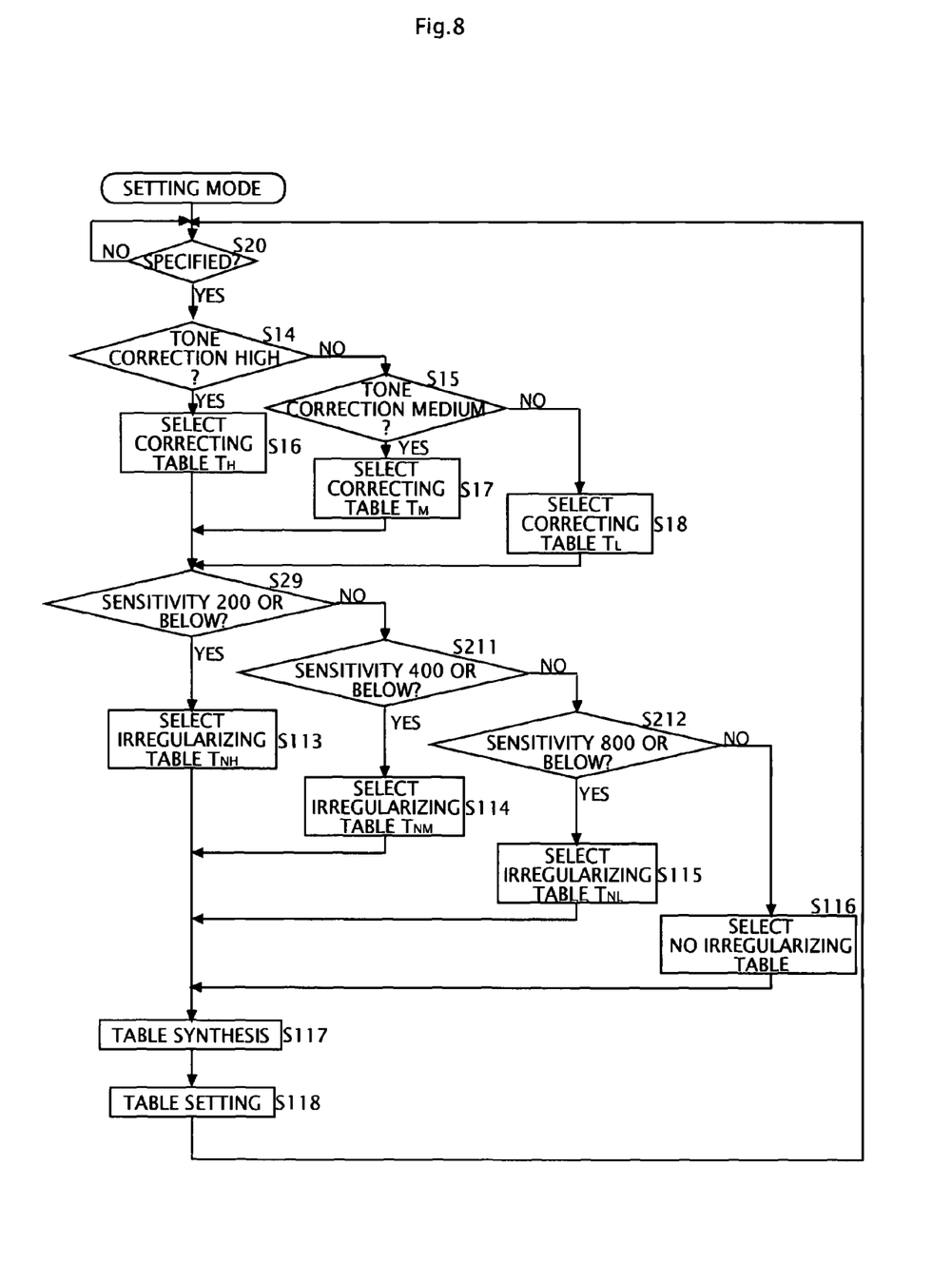
FIG. 8 is an operational flow chart of a CPU 24 regarding setting of a tone-converting table in a setting mode according to a second embodiment.

FIG. 8 is an operational flow chart of the CPU 24 regarding generation and setting of a tone-converting table in the setting mode. The same step as in FIG. 7 in FIG. 8 is designated by the same symbol.

As shown in FIG. 8, when a user specifies an ISO sensitivity and a tone correction degree (Step S20 YES), the CPU 24 selects any of correcting tables $T_L$, $T_M$, and $T_H$ according to the tone correction degree specified by the user (Steps S14, S15, S16, S17 and S18).

Further, the CPU 24 discriminates whether the ISO sensitivity specified by the user is 200 or below (Step S29), and, in the case of 200 or below (Step S29 YES), the CPU 24 selects the irregularizing table $T_{NH}$ which is a high irregularization degree, among the irregularizing tables $T_{NL}$, $T_{NM}$, and $T_{NH}$ shown in FIG. 4 (Step S113).

Also, in the case that the ISO sensitivity is above 200 (Step S29 NO), the CPU 24 discriminates whether the ISO sensitivity is 400 or below (Step S211), and in the case that the ISO sensitivity is 400 or below (Step 211 YES), the CPU 24 selects the irregularizing table $T_{NM}$ which is a medium irregularization degree, among irregularizing tables $T_{NL}$, $T_{NM}$, and $T_{NH}$ shown in FIG. 4 (Step S114).

Also, in the case the ISO sensitivity is above 400 (Step S211 NO), the CPU 24 discriminates whether the ISO sensitivity is 800 or below (Step 212), and in the case that the ISO sensitivity is 800 or below (Step 212 YES), the CPU 24 selects the irregularizing table $T_{NL}$ which is a low irregularization degree, among the irregularizing tables $T_{NL}$, $T_{NM}$, and $T_{NH}$ shown in FIG. 4 (Step 115).

Also, in the case the ISO sensitivity is higher than 800 (Step S212 NO), the CPU 24 does not select an irregularizing table (Step S116).

Then, the CPU 24 synthesizes the selected correcting table and irregularizing table to generate a tone-converting table (Step S117), which is set into a tone conversional processing part 21-4 (Step S118). Details of these steps S117 and S118 are as described in the first embodiment.

As described above, the irregularization degree is set to be lower for a higher ISO sensitivity in the present system (Steps S116, S115, etc.). Since the gain of the amplifier 15 is set to be larger for a higher ISO sensitivity as described hereinabove, an S/N ratio of an image is deteriorated and an outline in a highlight area of the image tends not to be particularly unnoticeable. Therefore, it is not a problem to set the irregularization degree to be lower.

On the other hand, in the present system, the irregularization degree is set to be higher for a lower ISO sensitivity (Steps S117, S118, etc.). Since the gain of the amplifier 15 is set to be smaller for a lower ISO sensitivity as described above, an S/N ratio of an image is improved and an outline in a highlight area of an image tends to be noticeable. Therefore, the irregularization degree is preferably set to be higher.

Therefore, in the present system, the irregularization degree is always set to be appropriate according to a noise amount contained in an image.

(OTHERS)

Note that, although the irregularization degree is determined according to the image saturation rate in the first embodiment and the irregularization degree is determined according to the ISO sensitivity in the second embodiment, the irregularization degree may be determined according to other variable parameters of a system.

For example, in a system in which a chromatic correction degree of an image is variable, the irregularization degree may be determined according to a chromatic correction degree. In this case, the irregularization degree is preferably set to be higher for a lower chromatic correction degree. Here, change of the chromatic correction degree is carried out by change of characteristics (color-converting matrix) of the color-conversional processing part 21-5 (refer to FIG. 2).

Also, in a system in which a degree of edge reinforcement of an image is variable, the irregularization degree may be determined according to a degree of edge reinforcement. In this case, the irregularization degree is preferably set to be higher for a lower degree of edge reinforcement. Here, change of the degree of edge reinforcement is carried out by change of characteristics (edge filter) of the edge-reinforcement processing part 21-7 (refer to FIG. 2).

Figure 9:
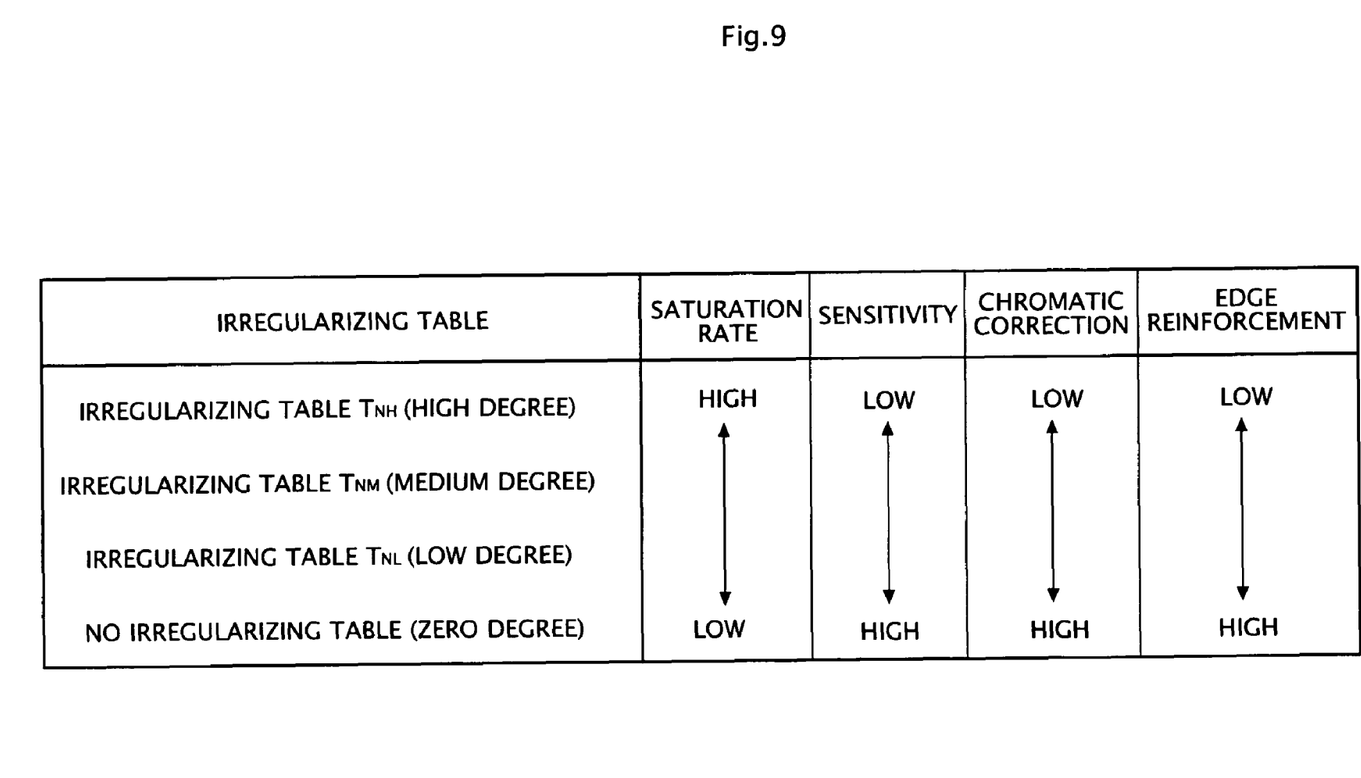
FIG. 9 is a table showing relationships between various variable parameters and irregularization degrees.

Also, although the irregularization degree is determined according to only one of variable parameters in the systems described hereinabove, the irregularization degree may be determined according to two or more variable parameters. For reference, relationships between various variable parameters and the irregularization degree are summarized in FIG. 9.

Also, although the irregularizing function is included in the tone conversional processing part 21-4 (refer to FIG. 2) in the systems described hereinabove, the irregularizing function may be included in other block arranged in a subsequent stage of the pixel-interpolation processing part 21-2 and the noise reducing part 21-3 and in a previous stage of the compressional/decompressional processing part 22.

For example, a block that performs tone conversional processing on each of chroma signals (Cb, and Cr) may be inserted between the color-coordinate transforming part 21-6 and the edge reinforcement processing part 21-7, and contents of a tone-converting table used for the tone-conversional processing may be reflected with contents similar to those of the irregularizing table (FIG. 4).

Also, although an image processing function, a information-compression processing function, and a controlling function are allotted to the image processing part 21, the compressional/decompressional processing part 22, and the CPU 24 in the systems described hereinabove, a part of or whole processing of the image processing part 21 may be carried out by the CPU 24 or a part of or whole processing of the compressional/decompressional processing part 22 may be carried out by the CPU 24. In either case, an operating program of the CPU 24 is stored in the ROM 24A.

Also, while the system described hereinabove is an electronic still camera system with an exchangeable lens, the system may be changed into other imaging apparatus such as an electronic still camera with an integrated lens, or a video camera.

Also, a part of or whole function regarding image processing in the systems described hereinabove can be mounted in not only imaging apparatus but also a variety of apparatuses capable of capturing an image such as an image storager, a printer, and the like. Also, a part of or whole of the image processing may be carried out by a computer.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image processing apparatus comprising:
   an inputting unit which inputs pixel signals representing a field image,
   an averaging unit which performs processing having an averaging effect on the pixel signals input by the inputting unit, and
   an irregularizing unit which changes each level of the pixel signals being processed by the averaging unit by a change amount corresponding to each level so as to irregularize pixel signals continuous in level at near a saturated level to pixel signals discontinuous in level, wherein
   at least one processor is configured to control one or more of the units.

2. The image processing apparatus according to claim 1, further comprising
   an information-compressioning unit which performs processing having an information-compressional effect in a brightness direction on the pixel signals after having been processed by said irregularizing unit.

3. The image processing apparatus according to claim 1, wherein
   processing by said irregularizing unit is tone conversional processing using a look-up table.

4. The image processing apparatus according to claim 3, wherein
   contents of said look-up table are set so that processing of said irregularization and the other tone correctional processing can be performed on the pixel signals at the same time.

5. The image processing apparatus according to claim 3, wherein
   contents of said look-up table are set so that an amplitude of said irregularization can depend on a magnitude of the level of the pixel signals before irregularization.

6. The image processing apparatus according to claim 3, wherein
   said irregularizing unit has multiple sorts of said look-up tables with different amplitudes of said irregularization and uses these look-up tables by switching according to the number of pixel signals at a saturated level among the pixel signals.

7. The image processing apparatus according to claim 3, wherein
   said irregularizing unit has multiple sorts of said look-up tables with different amplitudes of said irregularization and uses these look-up tables by switching according to contents of one or more kinds of processing which are to be performed on the pixel signals by unit except for said irregularizing unit.

8. An imaging apparatus comprising:
an imaging sensor which captures pixel signals representing a field image, and
the image processing apparatus according to claim 1.

9. A non-transitory computer readable medium comprising an image processing program causing a computer to execute:
an inputting operation which inputs pixel signals representing a field image,
an averaging operation which performs processing having an averaging effect on the pixel signals input by the inputting operation, and
an irregularizing operation which changes each level of the pixel signals being processed by the averaging operation by a change amount corresponding to each level so as to irregularize pixel signals continuous in level at near a saturated level to pixel signals discontinuous in level.

10. The non-transitory computer readable medium according to claim 9, wherein the image processing program causing a computer to further execute
an information-compressioning operation which performs processing having an information-compressional effect in a brightness direction on the pixel signals after having been processed by said irregularizing operation.

11. The non-transitory computer readable medium according to claim 9, wherein processing by said irregularizing operation is tone conversional processing using a look-up table.

12. An imaging apparatus comprising:
an imaging sensor which captures pixel signals representing a field image, and
the image processing apparatus according to claim 2.

13. An imaging apparatus comprising:
an imaging sensor which captures pixel signals representing a field image, and
the image processing apparatus according to claim 3.

14. An imaging apparatus comprising:
an imaging sensor which captures pixel signals representing a field image, and
the image processing apparatus according to claim 4.

15. An imaging apparatus comprising:
an imaging sensor which captures pixel signals representing a field image, and
the image processing apparatus according to claim 5.

16. An imaging apparatus comprising:
an imaging sensor which captures pixel signals representing a field image, and
the image processing apparatus according to claim 6.

17. An imaging apparatus comprising:
an imaging sensor which captures pixel signals representing a field image, and
the image processing apparatus according to claim 7.

* * * * *